US008108528B2

(12) United States Patent
Jones et al.

(10) Patent No.: US 8,108,528 B2
(45) Date of Patent: Jan. 31, 2012

(54) SYSTEM AND METHOD FOR VERIFYING THE IDENTITY OF A CHAT PARTNER DURING AN INSTANT MESSAGING SESSION

(75) Inventors: Doris L. Jones, Somerville, MA (US); Ruthie D. Lyle, Durham, NC (US); Corinne M. Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/775,990

(22) Filed: Jul. 11, 2007

(65) Prior Publication Data

US 2009/0019118 A1 Jan. 15, 2009

(51) Int. Cl.
*G06F 15/16* (2006.01)

(52) U.S. Cl. ........ 709/227; 709/207; 709/204; 709/205; 709/206; 715/751; 715/753; 715/758; 715/759; 715/741; 715/742; 715/743

(58) Field of Classification Search .......... 709/227, 709/207, 204, 205, 206; 715/751, 753, 758, 715/759, 741, 742, 743
See application file for complete search history.

(56) References Cited

U.S. PATENT DOCUMENTS

| | | | | |
|---|---|---|---|---|
| 6,356,622 | B1* | 3/2002 | Hassell et al. | 379/1.01 |
| 6,874,031 | B2* | 3/2005 | Corbeil | 709/229 |
| 7,225,464 | B2* | 5/2007 | Satyavolu et al. | 726/10 |
| 2003/0018725 | A1* | 1/2003 | Turner et al. | 709/206 |
| 2004/0015610 | A1* | 1/2004 | Treadwell | 709/246 |
| 2004/0122685 | A1* | 6/2004 | Bunce | 705/1 |
| 2004/0236838 | A1* | 11/2004 | Tout | 709/207 |
| 2005/0027672 | A1* | 2/2005 | Arndt et al. | 707/1 |
| 2005/0172018 | A1* | 8/2005 | Devine et al. | 709/223 |
| 2006/0085417 | A1* | 4/2006 | John et al. | 707/6 |
| 2006/0195363 | A1* | 8/2006 | Heron et al. | 705/26 |
| 2007/0143475 | A1* | 6/2007 | Daigle | 709/225 |
| 2007/0156836 | A1* | 7/2007 | Kelso et al. | 709/207 |
| 2008/0086317 | A1* | 4/2008 | Jones et al. | 705/1 |

OTHER PUBLICATIONS http://www.aimatwork.com/identity/.
http://docs.sun.com/source/817-4114-10/examples.html#wp533513.

* cited by examiner

*Primary Examiner* — Krista Zele
*Assistant Examiner* — James Forman
(74) *Attorney, Agent, or Firm* — David A. Dagg (57) ABSTRACT

A system for verifying the identity of a chat partner during an instant messaging session. The identity of an instant messaging partner can be verified at any given moment during an instant messaging session. The status of the verification is displayed in the current session, and is contained into any subsequently saved session history file. Prior to the beginning of communication, a participant has the ability to challenge one or more other participants to verify that they are really the people assigned to the corresponding instant messaging identifiers. During the instant messaging session, participants are further allowed to challenge any other participant before going further with the session (e.g. prior to discussing confidential information or accepting files). The system addresses the problem of an unauthorized user gaining access to another user's instant messaging identifier.

21 Claims, 4 Drawing Sheets

SYSTEM AND METHOD FOR VERIFYING THE IDENTITY OF A CHAT PARTNER DURING AN INSTANT MESSAGING SESSION

FIELD OF THE INVENTION

The present invention relates generally to computer based communication and collaboration applications, and more specifically to a method and system for verifying the identity of a chat partner during an instant messaging session.

BACKGROUND OF THE INVENTION

As it is generally known, instant messaging (IM) systems have become increasingly popular for both business and personal use. Existing instant messaging systems provide real-time communication between two or more people by conveying text and/or other content between client devices connected over a network such as the Internet. Typical existing instant messaging systems operate using an instant messaging client program or the like that connects to an instant messaging service provided through one or more remote server systems. Instant messaging is sometimes referred to as "chatting" on-line, and an instant messaging session is sometime referred to as a "chat" session. Examples of existing instant messaging systems include AOL Instant Messenger, Microsoft Network (MSN) Messenger, and Yahoo! Messenger, as well as IBM Lotus Sametime®, Microsoft Office® Live Communications Server, and Jabber XCP.

A problem with existing systems relates to the need for users to be able to confirm the identity of other users with whom they are currently participating in an instant messaging session. Most existing instant messaging systems have the ability to integrate with a corporate LDAP (Lightweight Directory Access Protocol) directory, which provides authentication at the time users sign-on. However, existing systems fail to handle the case where a participant's identity has been obtained by someone else. Unfortunately, there are many ways for this to happen. For example, an instant messaging session may be left open and unattended on a user's client device, thus inadvertently allowing another person to enter an on-going conversation with the same instant messaging identity as the absent user. Given that an increasing amount of confidential business is communicated via instant messaging, the lack of an ability to verify a participant's credentials during a conversation poses a serious security threat. Without an adequate solution, this vulnerability may lead to the disclosure of confidential information, infiltration of malicious content, and/or phishing.

For these reasons and others, it would be desirable to have a system that enables a participant in an instant messaging session to verify the identity of another participant at any given time during a session, that provides configurable levels of verification requirements, and that can log the resulting status of the verification into a saved history file for the instant messaging session.

SUMMARY OF THE INVENTION

In order to address the above described and other shortcomings of previous techniques, a method and system are disclosed for verifying the identity of a chat partner during an instant messaging session. In the disclosed system, the identity of an instant messaging partner can be verified at any given moment during an instant messaging session. The status of the verification is displayed in the current session, and is contained into any subsequently saved session history file.

In the disclosed system, a user may decide at various specific times to verify the identify of one or more other session participants. For example, at the initiation of an instant messaging session, prior to the beginning of communication, a participant has the ability to challenge one or more other participants to verify that they are really the people assigned to the corresponding instant messaging identifiers. Similarly, during the instant messaging session (e.g. prior to discussing confidential information or accepting files), participants are further allowed to challenge any other participant before going further with the session. The specific actions required for a user to authenticate their identity may be associated with configurable authentication levels or the like, as well as the actions performed in the event that an authentication fails for one or more participants.

The disclosed system advantageously addresses the problem of an unauthorized user gaining access to another user's instant messaging identifier, including the situation where a user leaves their current conversation unattended and an "imposter" decides to enter the session using their screen name.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
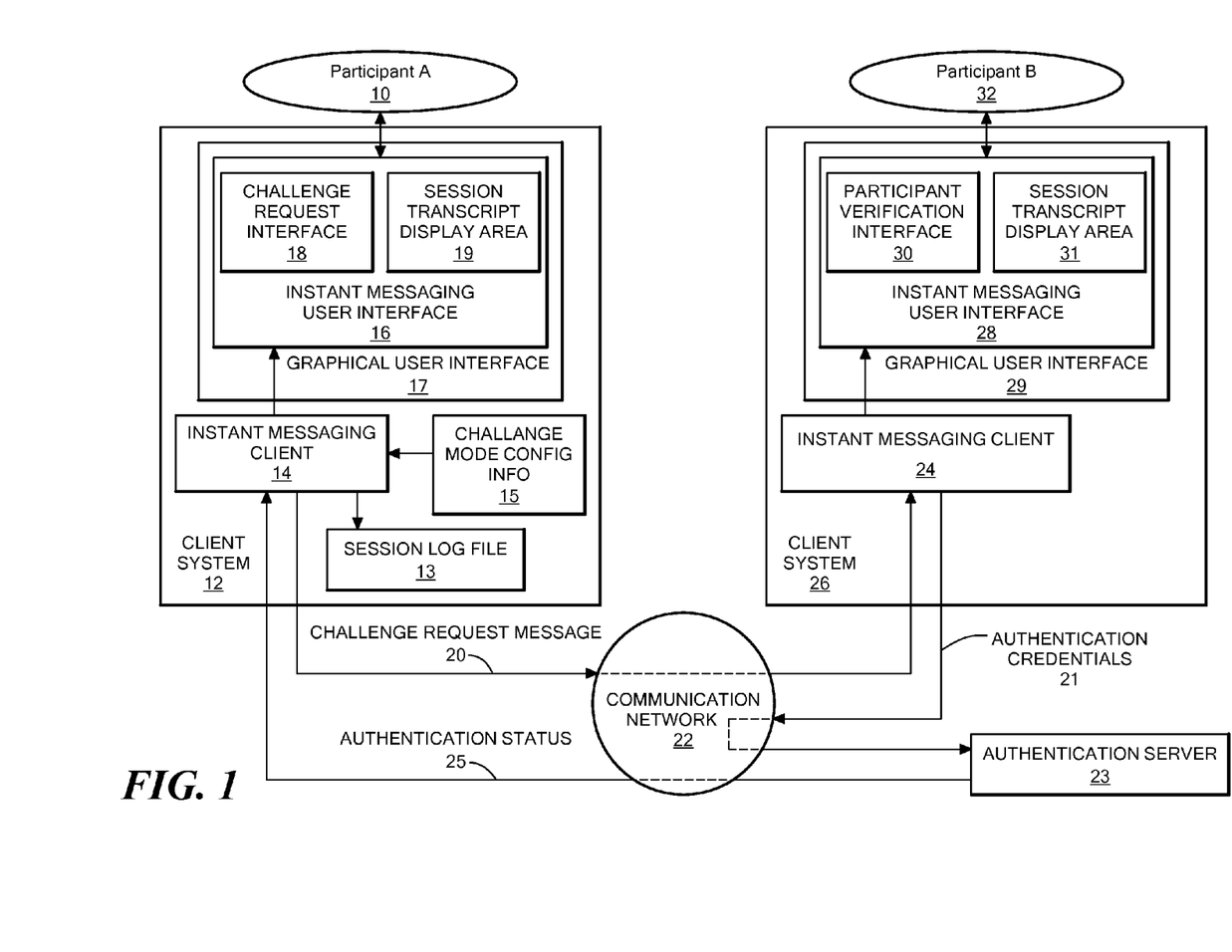
FIG. 1 is a block diagram showing software and/or hardware components in an illustrative embodiment of the disclosed system.

FIG. 1 is a block diagram showing software and/or hardware components in an illustrative embodiment of the disclosed system. As shown in FIG. 1, a Participant A 10 is provided an Instant Messaging User Interface 16 generated by an Instant Messaging Client 14. The Instant Messaging User Interface 16 is shown contained within a Graphical User Interface 17 displayed on a display device of the Client System 12. The Instant Messaging User Interface 16 is shown including a Challenge Request Interface 18, and a Session Transcript Display Area 19.

The Instant Messaging Client 12 operates partly in response to the contents of Challenge Mode Configuration Information 15, and is further operable to store the contents of an instant messaging session into the Session Log File 13.

As also shown in FIG. 1, a Participant B 32 is provided with an Instant Messaging User Interface 26 generated by an Instant Messaging Client 24, and displayed within a Graphical User Interface 29 on a Client System 26. The Instant Messaging User Interface 28 is shown including a Participant Verification Interface 30 and a Session Transcript Area 31.

During operation of the embodiment of the disclosed system shown in FIG. 1, Participant A 10 is a participant in an instant messaging session being held with one or more other participants, including Participant B 32, and the contents of which is being displayed in the Session Transcript Display Area 19. At some point during the instant messaging session, Participant A 10 decides to use the Challenge Request Interface 18 to cause an authentication challenge command to be issued through the Instant Messaging Client 14 to one or more other participants in the session identified through the Challenge Request Interface 18. Accordingly, in the example of FIG. 1, the authentication challenge command indicates one or more other participants in the current instant messaging that are to be authenticated, for example including Participant B 32.

As a result of the authentication challenge command being received from Participant A 10 by the Instant Messaging Client 14, a Challenge Request Message 20 is sent through a Communication Network 22, eventually being passed to the Instant Messaging Client 24 on the Client System 26 of Participant B 32. In response to receipt of the Challenge Request Message 20, the Instant Messaging Client 24 generates the Participant Verification Interface 30 within the Instant Messaging User Interface 28. The Participant Verification Interface 30 requires that Participant B 32 perform a number of actions to prove that they are in fact the person associated with a given screen name or other identifier being used to participate in a the current instant messaging session with Participant A 10. For example, the Participant Verification Interface 30 may require that Participant B 32 enter or otherwise provide one or more Authentication Credentials 21, such as a user name and a password. In the illustrative embodiment of FIG. 1, the Authentication Credentials 21 entered by Participant B 32 are then sent through the Communication Network 22 to an Authentication Server 23.

The Authentication Server 23 includes authentication logic operable to determine whether the Authentication Credentials 21 are effective to confirm that Participant B 32 is actually the user associated with the selected screen name currently participating in the current instant messaging session with Participant A 10. For example, the Authentication Server 23 may compare username and password information in the Authentication Credentials to authentication information stored in a credentials database or the like and associated with the screen name for Participant B 32, in order to determine whether an imposter is using Participant B 32's screen name in the current instant messaging session. The result of this operation is an Authentication Status 25 that is transmitted through the Communication Network 22, and eventually delivered to the Instant Messaging Client 14 on the Client System 12. The Authentication Status 25 indicates whether the authentication steps performed in the Authentication Server 23 on the Authentication Credentials 21 were successful to authenticate Participant B 32 for the current instant messaging session. The Authentication Status 25 may further indicate the sensitivity level of the authentication challenge, and/or the type of authentication challenge performed as a result of the authentication challenge. For example, in one embodiment, the Authentication Status 25 includes a numerical or text sensitivity level associated with the authentication challenge (e.g. "High", "Medium", "Low", "3", "2", "1", or the like), and/or a description of the type of challenge issued (e.g. "Username/Password Challenge", "Credentials E-mailed for Retrieval", etc.).

If the authentication was successful, then the current instant messaging session is permitted to continue, and an indication of the authentication challenge command and its sensitivity level and/or specific challenge type (e.g. "Participant A Challenged Participant B—Sensitivity Level High", "Participant A Challenged Participant B—Username/Password Challenge", etc.), and/or the returned Authentication Status 25 (e.g. "Participant B Successfully Authenticated—Sensitivity Level High", Participant B Successfully Authenticated—Username/Password Challenge", etc.), are displayed to the session participants in the current session transcript, for example through session transcript display areas in the respective user interfaces such as Session Transcript Display Area 19 and Session Transcript Display Area 31 in FIG. 1. Similarly, indications of the authentication challenge command, sensitivity level, challenge type, and/or returned authentication status may be stored as part of a session log in the Session Log File 13.

If the authentication based on Authentication Credentials 21 is unsuccessful, or if no authentication credentials are received for Participant B 32 within a predetermined time period, then the returned Authentication Status 25 (e.g. "Participant B Failed Authentication Challenge—Sensitivity Level High") and indication of the authentication challenge command itself and its sensitivity level and/or specific challenge type (e.g. Participant A Challenged Participant B—Sensitivity Level High"), are displayed to the session participants in the current session transcript, for example through session transcript display areas in the respective user interfaces such as Session Transcript Display Area 19 and/or Session Transcript Display Area 31 in FIG. 1. Further in the case of a failed authentication challenge, one or more predetermined actions may be taken with regard to the current instant messaging session. For example, in one embodiment, an authentication failure causes the current instant messaging session to be disabled, such that no further messages can be added to the session, and/or such that the display of the current session is erased. The display of the current session may, for example, be erased specifically in the user interfaces of the participant(s) that failed the authentication challenge, e.g. the Session Transcript Display Area 31 may be erased in the event that an authentication challenge to Participant B failed. In addition, a special message regarding the authentication failure may be displayed in one or more user interface displays for session participants. For example, a text message indicating that the challenge failed, the time the challenge was issued, and the issuer of the challenge may be displayed on the Session Transcript Display Area 31 and/or Participant Verification Interface 30 for Participant B 32 in the event that an authentication challenge issued by Participant A 10 failed. In one embodiment, such an "authentication challenge failed" message may be displayed in a way that prevents it from being erased without Participant B 32 providing proper authentication credentials. Such an "unerasable" authentication failure message presented on the Session Transcript Display Area 31 or Participant Verification Interface 30 advantageously ensures that the session participant against whom the authentication challenge failed (e.g. Participant B 32) is informed of the failure, thus alerting them to the fact that an imposter may have attempted to participate in an instant messaging session using Participant B 32's screen name, and/or that an authentication challenge command was issued against them while they were away from Client System 26 and were accordingly unable to provide the requested authentication credentials in time to prevent the authentication challenge made against them from failing.

The specific actions required for a participant to authenticate themselves in response to an authentication challenge may be responsive to and/or defined by the contents of the Challenge Mode Configuration Information 15 in combination with information input with the authentication challenge command from the participant issuing the challenge. For example, in one embodiment, the graphical user interface (e.g. Challenge Request Interface 18) allows the user issuing the challenge to select a particular type of actions to be required of the challenged user (e.g. enter username and password, go to an indicated trusted entity to authenticate and obtain credentials to continue participating in the current session, retrieve and enter key sent via e-mail to continue the current session, etc.), define a threshold of failed attempts to be allowed (i.e. the number of times the challenged user can fail the challenge before a failure status is generated), indicate if the failure to pass the challenge should additionally be communicated to the user interface of the challenged user (e.g. to the owner of the screen name/user identifier indicated through the authentication challenge command) via one or more other communication mechanisms, such as e-mail or the like.

In another embodiment, one or more sensitivity levels or challenge modes are used, for example as defined or configured by a local user (e.g. Participant A 10) in the Challenge Mode Configuration Information 15. Such challenge modes or sensitivity levels may be selectable by the user issuing the authentication challenge command, e.g. through the Challenge Request Interface 18 or the like. The selected challenge mode or sensitivity level may, for example, control the type of challenge to be issued, the number of tries permitted for a challenged participant to attempt to enter correct authentication credentials before a failure status is generated, the action(s) to be performed in response to an authentication failure, and/or other aspects or parameters of the authentication challenge. For example, an "Extremely Sensitive" challenge mode might only allow the challenged user to try to enter their credentials once before an authentication failure status is generated, a "Moderately Sensitive" challenge mode might allow a larger number of tries (e.g. two tries), and a "Sensitive" challenge mode might allow an even larger number of tries (e.g. three tries). The challenge mode or sensitivity level of an authentication challenge in such an embodiment may also be stored within any log file used to save the contents of an instant messaging session (e.g. Session Log File 13).

While only two participants are shown for purposes of concise illustration in FIG. 1, the disclosed system is not so limited. Accordingly, disclosed system is operable for instant messaging sessions involving several participants. Moreover, the disclosed system may be embodied such that the challenging user (e.g. Participant A 10) can select several other participants (e.g. by selecting multiple screen names or the like) to whom challenges are to be issued through the Challenge Request Interface 18. In such circumstances, the challenging user may further be allowed to indicate whether all challenged participants must be correctly authenticated in order for the session to continue at all for any user, whether the session should be disabled only for those participants that fail authentication, etc. Such challenge parameters for multiple challenged users may further be indicated by information stored in the Challenge Mode Configuration Information 15, and accordingly determined by a selected one of multiple selectable challenge modes. Similarly as described above, challenges issued and their results are stored to any stored session log (e.g. session log file 13), and challenge failure notifications provided to the owners of screen names or the like that failed authentication, e.g. within the instant messaging user interfaces of those participants or through external communication applications such as e-mail.

The client systems 12 and 26 of FIG. 1 may be any specific type of a computer system or intelligent electronic device, such as a desktop, laptop, or palmtop computer system, or a personal digital assistant, cell phone, or other electronic device. Each of the client systems 12 and 26 include or control a display device capable of displaying the graphical user interfaces 17 and 29 to the local users 10 and 32 of those systems, such as a liquid crystal display (LCD), cathode ray tube (CRT), interferometric modulator display (IMOD), light emitting diode (LED), or the like.

Those skilled in the art will recognize that the instant messaging clients 14 and 24 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the client systems 12 and 26, and Authentication Server 23, may include one or more processors, and program storage, such as memory, for storing program code executable on such processors, as well as input/output devices and/or interfaces. As illustrated in FIG. 1, the client systems 12 and 26, and Authentication Server 23, are interconnected to a computer or data Communication Network 22 (e.g. the Internet, a Local Area Network, etc.) through one or more of such input/output devices or interfaces, and through which may further be provided communication to a number of other client systems and/or other server systems.

Figure 2:
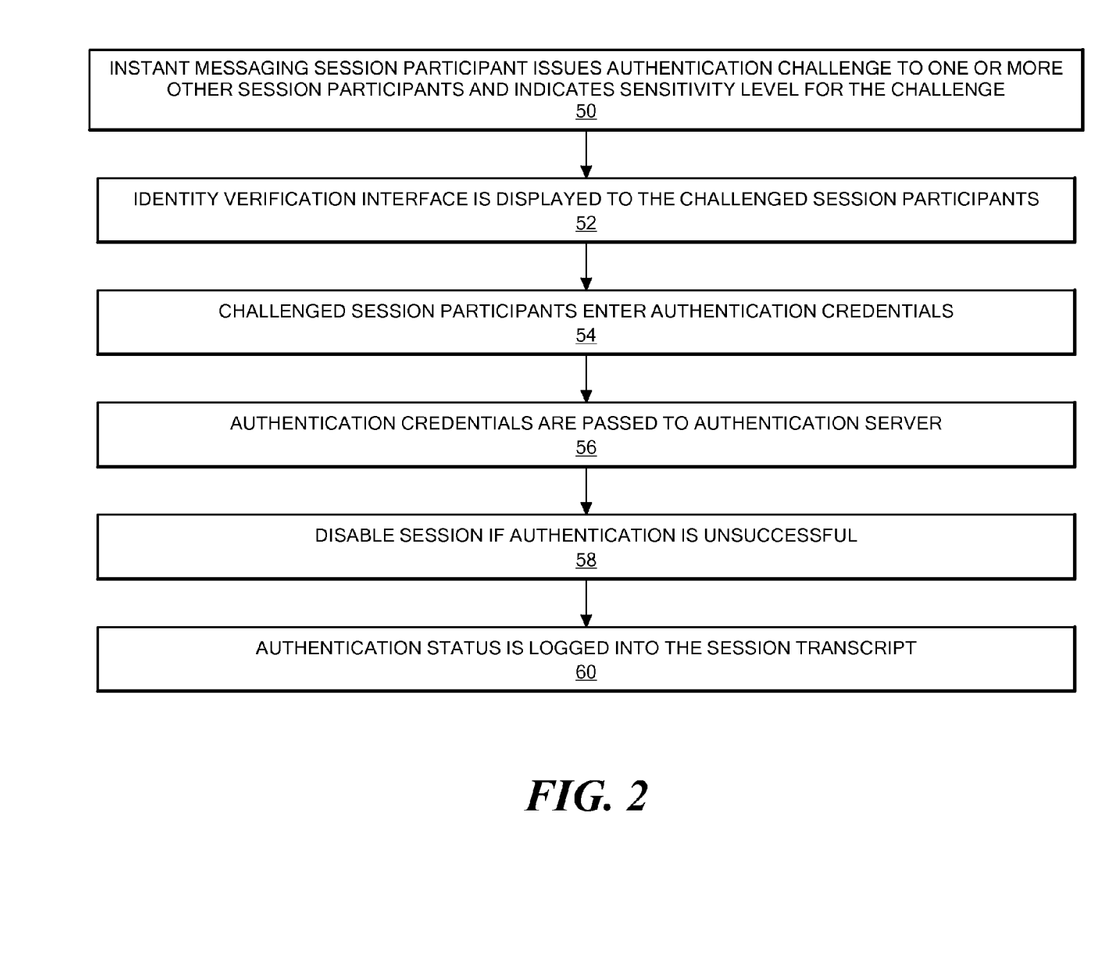
FIG. 2 is a flow chart showing steps performed during operation of an illustrative embodiment of the disclosed system.

FIG. 2 is a flow chart showing steps performed during operation of an illustrative embodiment of the disclosed system. As shown in FIG. 2, at step 50 an instant messaging session participant issues an authentication challenge to one or more other participants in the current instant messaging session, and indicates a sensitivity level to associated with the challenge. For example, the sensitivity level associated with the challenge may determine how many times the challenged participant(s) is/are allowed to try to enter their authentication credentials before an authentication failure is detected, the specific action(s) taken in the event the authentication challenge fails for one or more challenged participants (e.g. disable session for those participants that failed their authentication challenges, disable session for all participants, etc.), the specific type of challenge issued (e.g. username and password challenge, challenge requiring retrieval and entry of e-mailed credentials, etc.), and/or other challenge characteristics.

A visual indication (e.g. text description) of the challenge issued at step 50, including an indication or description of the sensitivity level of the challenge, is added to the transcript of the current session (e.g. as displayed in Session Transcript Display Areas 19 and 31 of FIG. 1), and is also saved into any log file for the session (e.g. Session Log File 13).

Figure 4:
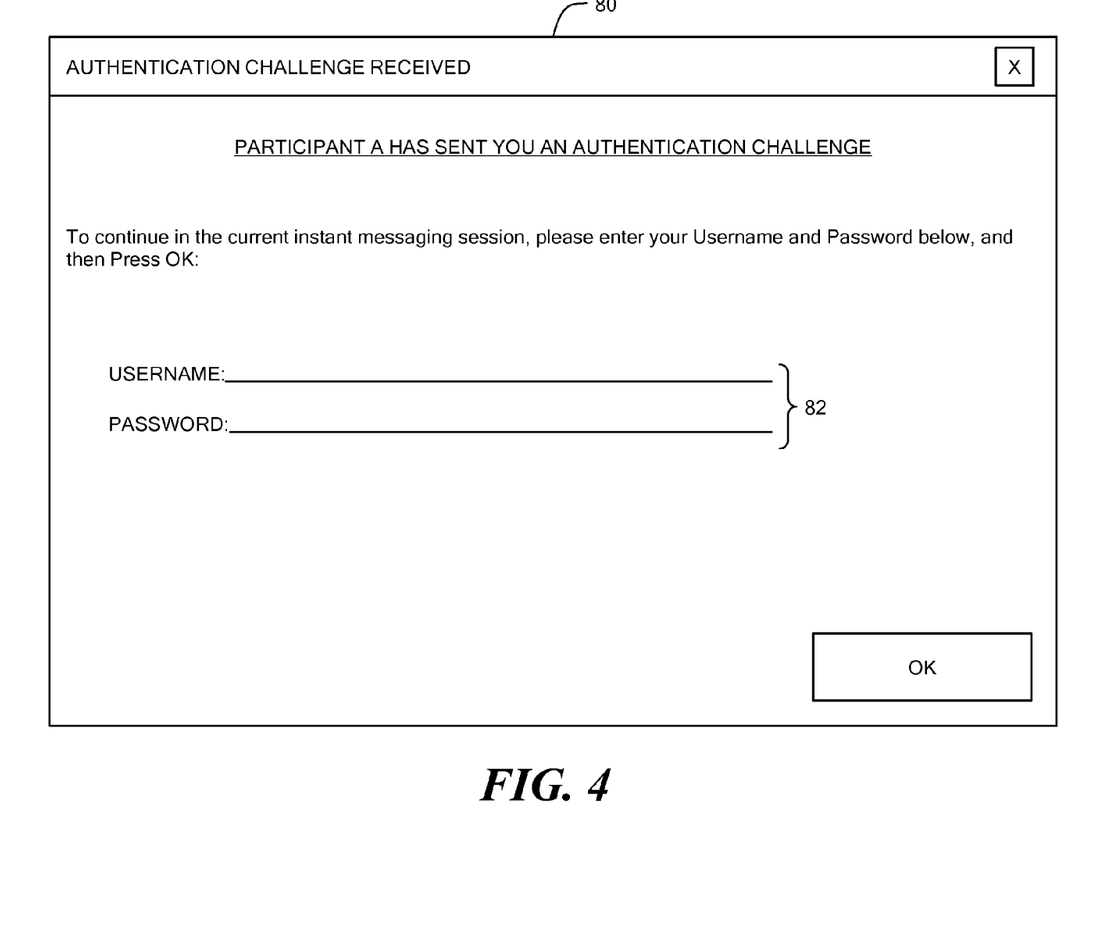
FIG. 4 is a simplified screen shot showing an example of a user interface enabling a user to authenticate their identity in response to an authentication challenge in an illustrative embodiment of the disclosed system.

At step 52, an identity verification interface is displayed to the challenged session participants (e.g. the example shown in FIG. 4). The disclosed system may be embodied to use various specific challenge types. For example, in a first embodiment, the challenged participants are prompted with a message in their user interface stating that an authentication challenge has been issued by a specified other participant (e.g. Participant A 10), and that the challenged participants (e.g. Participant B 32) are required to re-enter their instant messaging application credentials (e.g. user name and password) to resume their participation in the session. In another embodiment, the challenged participants are presented with a message in their user interface directing them to the location of a trusted source, such as a database, where they must authenticate in order to acquire a credential to be used to resume their participation in the current instant messaging session.

In another embodiment, the challenged participants are presented with a message in their user interfaces directing them to retrieve and enter a key or keys sent to them through an external application (e.g. e-mail), and that the retrieved key or keys much be then entered into the instant messaging application to resume their participation in the current session.

At step 54, the challenged participants enter the authentication credentials required by the message presented at step 52. The entered authentication credentials are then transmitted to one or more authentication servers at step 56, which operate to determine if the authentication credentials are valid.

If the authentication challenge fails for one or more participants, e.g. as a result of no action take (e.g. credentials entered) within a predetermined time limit, or of incorrect credentials being entered more than a threshold number of times, then the session may be disabled at step 58 at least for those participants that failed the authentication challenge. attempts. For example, in one embodiment, the challenged participants user interface may display a status messaging indicating the events that lead to the authentication failure (e.g. the issuer of the challenge, the time of the challenge, the time of the failure, etc.), and disable the session for the participants failing authentication by erasing or obscuring their transcript display areas for the session, e.g. by graying out the transcript display area of the participants that failed authentication, and/or preventing further instant messages from being entered by any participants. In one embodiment, after the instant messaging session is disabled in such circumstances, the ability of participants that failed authentication to save the contents of the session into a log file is disabled. In another embodiment, the instant messaging session user interface of the participant failing authentication cannot be closed until the instant messaging client is restarted (thus forcing re-authentication of that participant). This feature prevents an imposter user from closing the instant messaging user interface to prevent the actual participant from learning that their screen name or the like may have been "hi-jacked" by the imposter.

At step 60, the authentication status resulting from the authentication server processing the authentication credentials (e.g. "AUTHENTICATION CHALLENGE BY PARTICIPANT A OF PARTICIPANT B SUCCESSFUL", or "AUTHENTICATION CHALLENGE BY PARTICIPANT A OF PARTICIPANT B FAILED—SESSION DISABLED"), and optionally including the time of the challenge and/or resulting status, is added to the transcript and any saved log of the current session.

Figure 3:
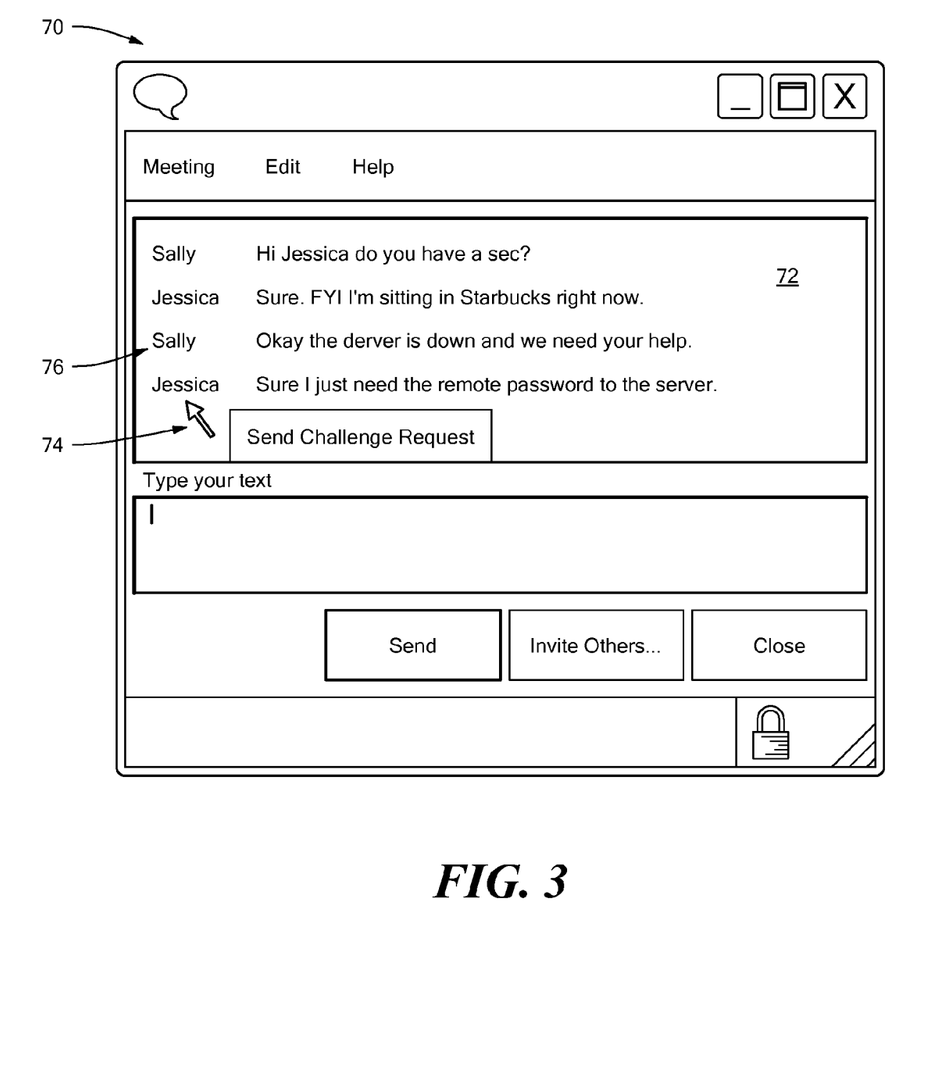
FIG. 3 is a simplified screen shot showing an example of a user interface enabling a user to issue an authentication challenge command in an illustrative embodiment of the disclosed system.

FIG. 3 is a simplified screen shot 70 showing an example of a user interface enabling a user to issue an authentication challenge command in an illustrative embodiment of the disclosed system. As shown in FIG. 3, a transcript display area 72 includes a number of instant messages having been entered by participants in a current instant messaging session. In the example of FIG. 3, the local user has hovered the cursor over the instant message 76 entered by the participant "Jessica", and then pressed the right click button on the mouse user interface device to obtain a context menu 74. The context menu 74 includes an option "SEND CHALLENGE REQUEST" that enables the local user to cause an authentication challenge command to be issued with regard to the participant that entered the instant message 76 (e.g. the participant having the screen name "Jessica"). Thus the transcript display 72 is an example of Session Transcript Display Area 19 in FIG. 1, and the context menu 74 is an example of the Challenge Request Interface 18 in FIG. 1. Alternatively, or in addition, any other specific technique (e.g. graphical button display objects, pull down menus, etc.) may be provided to a participant to enable them to select one or more other participants in a current instant messaging session that are to be authenticated using the disclosed system.

FIG. 4 is a simplified screen shot 80 showing an example of a user interface enabling a user to authenticate their identity in response to an authentication challenge in an illustrative embodiment of the disclosed system. As shown in FIG. 4, the challenged participant is required to enter their credentials through the fields 82 in order for them to be able to continue in a current instant messaging session. The screen shot 80 shows one example of the Participant Verification Interface 30 from FIG. 1. As noted above, a number of other specific types of authentication challenges may alternatively be issued by various embodiments of the disclosed system The disclosed system advantageously provides an "on-demand" capability to an instant messaging session participant to challenge and verify the identity of one or more other participants in the session. The disclosed system thus enables a session participant to wait to send confidential or sensitive material from over the session until one or more other selected participants have been successfully authenticated. The participant receiving the challenge may also receive additional helpful information, such as the identity of the participant issuing the challenge, the type of challenge issued, the subsequent results of the challenge (success or failed), and/or the time the challenge/verification occurred during the session. Such information may also advantageously be stored into the challenging participant's session log file.

Those skilled in the art will recognize that while the illustrative user identifiers "Participant A" and "Participant B" are used in the present description for general purposes of explanation, the disclosed system is applicable to any specific screen names or user identifiers that may be used in a given context or deployment.

Moreover, while the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for verifying the identity of an instant messaging session participant, comprising:
   providing a user interface object enabling a first instant messaging session participant to issue an authentication challenge command, said authentication challenge command including an identifier of a second instant messaging session participant to be authenticated;
   generating, responsive to receipt of said authentication challenge command, a participant verification user interface object within a graphical user interface of said second instant messaging session participant;
   receiving, through said participant verification user interface object, authentication credentials for said second instant messaging session participant;
   generating an authentication status for said second instant messaging session participant in response to said authentication credentials for said second instant messaging session participant; and
   automatically disabling an instant messaging session for said second instant messaging participant in responsive to said authentication status indicating a failure to authenticate said second instant messaging session participant, wherein said disabling prevents said second instant messaging participant from adding further messages to said instant messaging session and includes obscuring at least a transcript display area associated with said instant messaging session within said graphical user interface of said second instant messaging session participant.

2. The method of claim 1, further comprising:
   displaying, to at least said first instant messaging participant, an indication of said authentication challenge command and indication of said authentication status in a session transcript for said instant messaging session.

3. The method of claim 2, wherein said authentication status indicates a sensitivity level associated with said authentication challenge command.

4. The method of claim 2, wherein said authentication status indicates a type of authentication challenge performed as a result of said authentication challenge command.

5. The method of claim 2, further comprising:
   storing an indication of said authentication challenge command and indication of said authentication status in a session log file for said instant messaging session.

6. The method of claim 1, wherein said identifier of said second instant messaging session participant comprises an instant messaging screen name associated with said second instant messaging session participant.

7. The method of claim 1, wherein said authentication credentials for said second instant messaging session participant comprise a user name and password.

8. The method of claim 1, further comprising:
   wherein said participant verification user interface object instructs said second instant messaging session participant to authenticate at an indicated trusted entity to obtain said authentication credentials.

9. The method of claim 8, wherein said indicated trusted entity comprises a database.

10. The method of claim 1, further comprising:
    sending said authentication credentials to said second instant messaging session participant through an external communication application; and
    wherein said participant verification user interface object instructs said second instant messaging session participant to obtain said authentication credentials through said external communication application.

11. The method of claim 10, wherein said external communication application comprises an electronic mail application.

12. The method of claim 1, said automatically disabling said instant messaging session for said second instant messaging participant further comprising displaying a status message within said graphical user interface of said second instant messaging session participant, said status message indicating at least one event that lead to said failure to authenticate said second instant messaging session participant.

13. The method of claim 12, said automatically disabling said instant messaging session for said second instant messaging participant further comprising preventing said graphical user interface of said second instant messaging session participant from being closed without re-authentication by said second instant messaging session participant.

14. The method of claim 1, further comprising:
    enabling said first instant messaging session participant to enter a sensitivity level associated with said authentication challenge command, wherein said sensitivity level indicates a number of retries to be allowed for said second instant messaging session participant to enter said authentication credentials before an authentication failure is detected.

15. The method of claim 14, wherein said sensitivity level further indicates a type of challenge to be issued to said second instant messaging session participant.

16. The method of claim 15, wherein said sensitivity level is defined within user configuration information stored in a client device associated with said first instant messaging session participant.

17. An apparatus including a computer readable memory having program code stored thereon for execution on at least one processor in said apparatus, said program code operable when executed to cause said apparatus to verify the identity of an instant messaging session participant by:
   providing a user interface object enabling a first instant messaging session participant to issue an authentication challenge command, said authentication challenge command including an identifier of a second instant messaging session participant to be authenticated;

generating, responsive to receipt of said authentication challenge command, a participant verification user interface object within a graphical user interface of said second instant messaging session participant;

receiving, through said participant verification user interface object, authentication credentials for said second instant messaging session participant;

generating an authentication status for said second instant messaging session participant in response to said authentication credentials for said second instant messaging session participant; and disabling a previously opened instant messaging session for said second instant messaging participant in the event that said authentication status indicates a failure to authenticate said second instant messaging session participant, wherein said disabling prevents said second instant messaging participant from adding further messages to said instant messaging session and includes obscuring at least a transcript display area associated with said instant messaging session within said graphical user interface of said second instant messaging session participant.

18. A computer program product including a non-signal computer readable storage medium having program code stored thereon for execution on at least one processor in said apparatus, said program code operable when executed to cause a computer to verify the identity of an instant messaging session participant by:

providing a user interface object enabling a first instant messaging session participant to issue an authentication challenge command, said authentication challenge command including an identifier of a second instant messaging session participant to be authenticated;

generating, responsive to receipt of said authentication challenge command, a participant verification user interface object within a graphical user interface of said second instant messaging session participant;

receiving, through said participant verification user interface object, authentication credentials for said second instant messaging session participant;

generating an authentication status for said second instant messaging session participant in response to said authentication credentials for said second instant messaging session participant; and disabling an instant messaging session for said second instant messaging participant in the event that said authentication status indicates a failure to authenticate said second instant messaging session participant, wherein said disabling prevents said second instant messaging participant from adding further messages to said instant messaging session and includes obscuring at least a transcript display area associated with said instant messaging session within said graphical user interface of said second instant messaging session participant.

19. The method of claim 1, wherein said obscuring said transcript display area associated with said instant messaging session within said graphical user interface of said second instant messaging session participant comprises graying out said instant messaging session within said graphical user interface of said second instant messaging session participant.

20. The method of claim 1, wherein said automatically disabling an instant messaging session for said second instant messaging participant further comprises preventing said second instant messaging participant from storing a log file associated with said instant messaging session.

21. A system for verifying the identity of an instant messaging session participant, comprising:

means for providing a user interface object enabling a first instant messaging session participant to issue an authentication challenge command, said authentication challenge command including an identifier of a second instant messaging session participant to be authenticated;

means for generating, responsive to receipt of said authentication challenge command, a participant verification user interface object within a graphical user interface of said second instant messaging session participant and for receiving, through said participant verification user interface object, authentication credentials for said second instant messaging session participant; and means for generating an authentication status for said second instant messaging session participant in response to said authentication credentials for said second instant messaging session participant and for disabling an instant messaging session for said second instant messaging participant in the event that said authentication status indicates a failure to authenticate said second instant messaging session participant, wherein said disabling prevents said second instant messaging participant from adding further messages to said instant messaging session and includes obscuring at least a transcript display area associated with said instant messaging session within said graphical user interface of said second instant messaging session participant.

* * * * *